(12) United States Patent
Hansen et al.

(10) Patent No.: US 8,088,256 B2
(45) Date of Patent: Jan. 3, 2012

(54) PROCESS FOR PRODUCING PAPERMAKER'S AND INDUSTRIAL FABRIC SEAM AND SEAM PRODUCED BY THAT METHOD

(75) Inventors: Robert Hansen, North Muskegon, MI (US); Dana Eagles, Sherborn, MA (US); Lennart Olsson, Simlångsdalen (SE)

(73) Assignee: Albany International Corp., Albany, NY (US)

( * ) Notice: Subject to any disclaimer, the term of this patent is extended or adjusted under 35 U.S.C. 154(b) by 349 days.

(21) Appl. No.: 12/398,799

(22) Filed: Mar. 5, 2009

(65) Prior Publication Data
US 2010/0024178 A1 Feb. 4, 2010

Related U.S. Application Data

(63) Continuation-in-part of application No. 12/231,669, filed on Sep. 4, 2008.

(60) Provisional application No. 60/967,489, filed on Sep. 5, 2007.

(51) Int. Cl.
*D21F 7/10* (2006.01)
*D21F 1/10* (2006.01)
*B29C 65/16* (2006.01)

(52) U.S. Cl. ............... 162/348; 162/904; 156/272.8; 28/110

(58) Field of Classification Search ............. 162/348, 162/358.2, 900, 902–904; 139/383 AA, 383 A, 139/383 R, 425 A; 156/304.1, 304.6, 272.8; 428/57, 58; 28/110, 142
See application file for complete search history.

(56) References Cited

U.S. PATENT DOCUMENTS

| | | | |
|---|---|---|---|
| 3,973,064 A | 8/1976 | Paine | |
| 4,032,382 A | 6/1977 | Obeda | |
| 4,156,626 A | 5/1979 | Souder | |
| 4,401,137 A | 8/1983 | Cannon | |
| 4,501,782 A | 2/1985 | Weatherly et al. | |
| 4,701,229 A | 10/1987 | Arakawa et al. | |
| 4,906,320 A | 3/1990 | Powers | |
| 5,170,031 A | 12/1992 | Russell et al. | |
| 5,204,150 A * | 4/1993 | Davenport | 428/58 |
| 5,334,289 A | 8/1994 | Trokhan et al. | |
| 5,391,419 A | 2/1995 | Davenport | |
| 5,464,488 A | 11/1995 | Servin | |
| 5,501,759 A | 3/1996 | Forman | |

(Continued)

FOREIGN PATENT DOCUMENTS

CA 2552009 2/2007

(Continued)

OTHER PUBLICATIONS

International Search Repot and Written Opinion issued by European Patent Office for corresponding international application PCT/US2009/054653.

(Continued)

*Primary Examiner* — Eric Hug
(74) *Attorney, Agent, or Firm* — Frommer Lawrence & Haug LLP; Ronald R Santucci (57) ABSTRACT

The invention disclosed herein relates to the use of laser energy to weld or fuse selected locations in paper machine clothing ("PMC") and other industrial and engineered fabrics. The invention also relates to an improved loop seam for an on machine seamable papermaker or other industrial fabric.

12 Claims, 5 Drawing Sheets

U.S. PATENT DOCUMENTS

| | | | |
|---|---|---|---|
| 5,554,467 A | 9/1996 | Trokhan et al. | |
| 5,571,590 A | 11/1996 | Schultz et al. | |
| 5,624,790 A | 4/1997 | Trokhan et al. | |
| 5,670,230 A | 9/1997 | Schlueter Jr. et al. | |
| 5,674,663 A | 10/1997 | McFarland et al. | |
| 5,686,639 A | 11/1997 | Cohen | |
| 5,693,187 A | 12/1997 | Ampulski et al. | |
| 5,711,847 A | 1/1998 | Rajala et al. | |
| 5,713,399 A | 2/1998 | Collette et al. | |
| 5,721,032 A | 2/1998 | Parker et al. | |
| 5,731,063 A | 3/1998 | Schultz et al. | |
| 5,740,314 A | 4/1998 | Grimm | |
| 5,783,377 A | 7/1998 | Mee et al. | |
| 5,837,103 A | 11/1998 | Trokhan et al. | |
| 5,840,147 A | 11/1998 | Grimm | |
| 5,843,265 A | 12/1998 | Grimm | |
| 5,871,887 A | 2/1999 | Trokhan et al. | |
| 5,888,915 A | 3/1999 | Denton et al. | |
| 5,939,176 A | 8/1999 | Yook | |
| 6,099,670 A | 8/2000 | Louks et al. | |
| 6,162,518 A | 12/2000 | Korfer | |
| 6,491,794 B2 | 12/2002 | Davenport | |
| 6,517,650 B2 | 2/2003 | Couillard et al. | |
| 6,547,903 B1 | 4/2003 | McNichols et al. | |
| 6,547,904 B1 | 4/2003 | Young | |
| 6,656,315 B2 | 12/2003 | Sallavanti et al. | |
| 6,702,927 B2 | 3/2004 | Moriarty et al. | |
| 6,763,855 B2 | 7/2004 | Rougvie | |
| 7,220,340 B2 | 5/2007 | Best | |
| 7,384,513 B2 | 6/2008 | Eagles | |
| 7,393,434 B2 | 7/2008 | Kornett | |
| 2003/0221739 A1 | 12/2003 | Billings | |
| 2004/0056006 A1 | 3/2004 | Jones et al. | |
| 2004/0126569 A1 | 7/2004 | Davenport | |
| 2005/0102763 A1 | 5/2005 | Eagles | |
| 2007/0028997 A1* | 2/2007 | Best et al. | 139/383 R |
| 2007/0235155 A1 | 10/2007 | Best et al. | |

FOREIGN PATENT DOCUMENTS

| | | | |
|---|---|---|---|
| CA | 2552009 A | | 2/2007 |
| DE | 39 21 712 C | | 9/1990 |
| DE | 20 2006 004 624 U1 | | 7/2006 |
| EP | 0 947 623 A | | 10/1999 |
| FR | 2 874 188 A | | 2/2006 |
| GB | 2232637 | | 12/1990 |
| JP | 09-207223 | | 8/1997 |
| WO | WO 96/40517 A | | 12/1996 |
| WO | WO 99/16964 A | | 4/1999 |
| WO | WO 99/53237 A | | 10/1999 |
| WO | WO 00/02723 A | | 1/2000 |
| WO | WO 01/58997 A | | 8/2001 |
| WO | WO 02/38677 A | | 5/2002 |
| WO | WO 02/057353 A | | 7/2002 |
| WO | WO 2004/055265 A | | 7/2004 |
| WO | WO 2006/074105 A | | 7/2006 |

OTHER PUBLICATIONS

International Search Report and Written Opinion issued by European Patent Office for International Application PCT/US2008/074388, mailed Jan. 1, 2009 (corresponding to U.S. Appl. No. 11/899,232).

International Search Report and Written Opinion issued by European Patent Office for International Application PCT/US2008/074312, mailed Mar. 10, 2009 (corresponding to U.S. Appl. No. 11/899,245).

Clear weld "The Concept" and Clearweld "The Clear Advantage, Clearweld Material Systems", pages from website www.clearweld.com (3 pages in total).

IPAC "Near, Mid & Far Infrared" pages from website www.ipac.caltech.edu (5 pages in total).

Backmann, Reinhard: "Textilschweißen—Thermisches Fügen und Verbinden von Textilien für Orthopädie- und Medizintechnik", Jan. 2004, retrieved from the Internet URL:http://www.grin.com/e-book/111374/textilschweissen-thermisches-fuegen-und-verbinden-von-textilien-fuer-orthopaedie, (retrieved on Nov. 10, 2008) total 21 pages (in German).

Anonymous: "High Frequency Technology", Aug. 10, 2003, retrieved from the Internet URL:http://web.archive.org/web/20030810015427/http://rfwelding.com/hpage07.htm, (retrieved on Nov. 10, 2008), total 5 pages (in English).

"Schneiden Schweissen und Siegeln Mittels Utraschall-Beruehrungslos und Verschleissfrei",*Deutscher Drucker*, 31 Sep. 21, 1995, No. 35, p. G29 (in German).

* cited by examiner

PROCESS FOR PRODUCING PAPERMAKER'S AND INDUSTRIAL FABRIC SEAM AND SEAM PRODUCED BY THAT METHOD

CROSS-REFERENCE TO RELATED APPLICATION

This application is a continuation-in-part application of and claims priority benefits of U.S. patent application Ser. No. 12/231,669, filed Sep. 4, 2008, which claims priority benefits from U.S. Provisional Patent Application Ser. No. 60/967,489 filed Sep. 5, 2007, the entire disclosures of which are hereby incorporated by reference.

FIELD OF THE INVENTION

The invention disclosed herein relates to the use of laser energy to weld or fuse selected locations in paper machine clothing ("PMC") and other industrial and engineered fabrics.

INCORPORATION BY REFERENCE

All patents, patent applications, documents and/or references referred to herein are incorporated by reference, and may be employed in the practice of the invention.

BACKGROUND OF THE INVENTION

The present invention relates to the papermaking arts including fabrics and belts used in the forming, pressing, and drying sections of a paper machine, and to industrial process fabrics and belts, TAD fabrics, engineered fabrics and belts, along with corrugator belts generally.

The fabrics and belts referred to herein may include those also used in the production of, among other things, wetlaid products such as paper and paper board, and sanitary tissue and towel products made by through-air drying processes; corrugator belts used to manufacture corrugated paper board and engineered fabrics used in the production of wetlaid and drylaid pulp; in processes related to papermaking such as those using sludge filters and chemiwashers; and in the production of nonwovens produced by hydroentangling (wet process), meltblowing, spunbonding, airlaid or needle punching. Such fabrics and belts include, but are not limited to: embossing, conveying, and support fabrics and belts used in processes for producing nonwovens; filtration fabrics and filtration cloths; and fabrics and belts used for textile finishing processes such as calendering and hide tanning.

Such belts and fabrics are subject to a wide variety of conditions for which functional characteristics need to be accounted. For example, during the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

It should be appreciated that these industrial fabrics such as paper machine clothing (PMC) such as the forming fabrics, press fabrics, and dryer fabrics, all take the form of endless loops on the paper machine and function in the manner of conveyers.

Such fabric structures are typically constructed from synthetic fibers and yarns, which may be monofilaments or yarns made with more than one filament plied and/or ply/twisted together, by conventional textile processing methods such as weaving, for example. Yarns may also be knitted or braided. It is often desirable to selectively tailor the fabric structure to affect or enhance a performance characteristic important to, for example, the papermaker, such as fabric life, sheet formation, runnability or paper properties.

Many of these fabrics are on machine seamable i.e., the fabric can be woven according to the desired dimensions and can be mounted on the machine so that the cross machine direction ("CD") edges of the fabric may be seamed on the paper machine itself. In case of press fabrics, this is typically carried out by interdigitating seaming loops formed by machine direction ("MD") yarns on the CD edges of the fabric and inserting a pintle into the channel formed by the interdigitated seaming loops. One method of making on machine seamable fabrics is referred to as "modified endless weaving," where the fabric is woven in a continuous loops and modified to take an on machine seamable form. In such a fabric, the warp yarns lie in the cross machine direction and the weft yarns lie in the machine direction. After the fabric is woven on the loom, the widthwise edges or CD edges of the fabric are brought together on the paper machine and the MD seam loops formed by the weft yarns are interdigitated, and the two edges are seamed by inserting a pintle into the channel formed by the interdigitated seam loops.

Another method is to produce a woven in loop seam or pin seam by flat weaving a fabric, raveling out some of the CD yarns, and weaving back in the MD yarns to form loops on each fabric edge. The loops can be interdigitated and the fabric can be seamed as discussed above. A third method is to produce a nonwoven fabric structure using an MD yarn array that forms the seaming loops. In this method, one or more layers of a single yarn are wound around two parallel rolls that are spaced apart. The yarn is wound in a spiral manner (yarns are at a slight angle to the MD of the final fabric) until a desired width of the fabric is reached. The distance between the rolls can be varied depending on the required MD length of the fabric in use. Similar methods and fabrics are disclosed, for example, in commonly owned U.S. Pat. No. 6,491,794 to Davenport and U.S. Patent Application Publication No. 2005/0102763 to Eagles, the entire contents of which are incorporated herein by reference Yet another method of making on machine seamable fabrics is to produce a seamed multiaxial fabric, such as that disclosed in commonly owned U.S. Pat. No. 5,939,176 to Yook, the entire contents of which is incorporated herein by reference.

In some fabrics, textile ply/twisted yarns or yarns with more than one strand or filament are used in the MD rather than a single monofilament. This is particularly necessary in nonwoven arrays when the anchoring of the MD yarns by the CD yarns does not occur. Such multistrand yarns provide for improved elasticity and strength and are an answer to the tensile and fatigue problems of a single monofilament. However, when one attempts to form the loops for a "pin seam" from these MD yarns, serious problems are encountered. The loops so formed have the tendency to deform at the apex or to lose their relative parallelism. In addition, the entire loop will rather easily deform or bend as one attempts to interdigitated the loops and/or force a pintle through the channel formed by the interdigitated loops.

Figure 1:
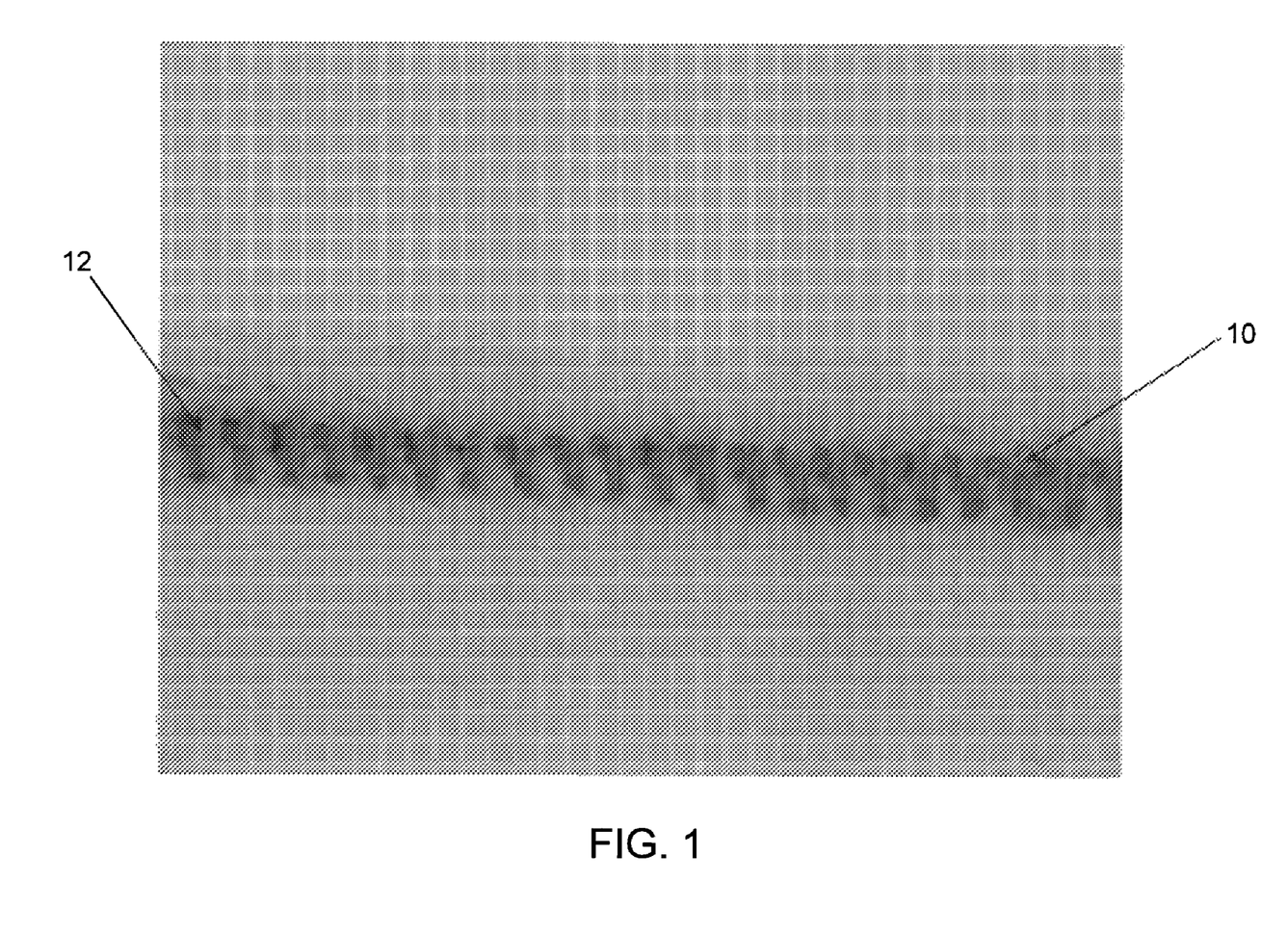
FIG. 1 is a photograph of a loop seam in an on machine seamable fabric.
Figure 2:
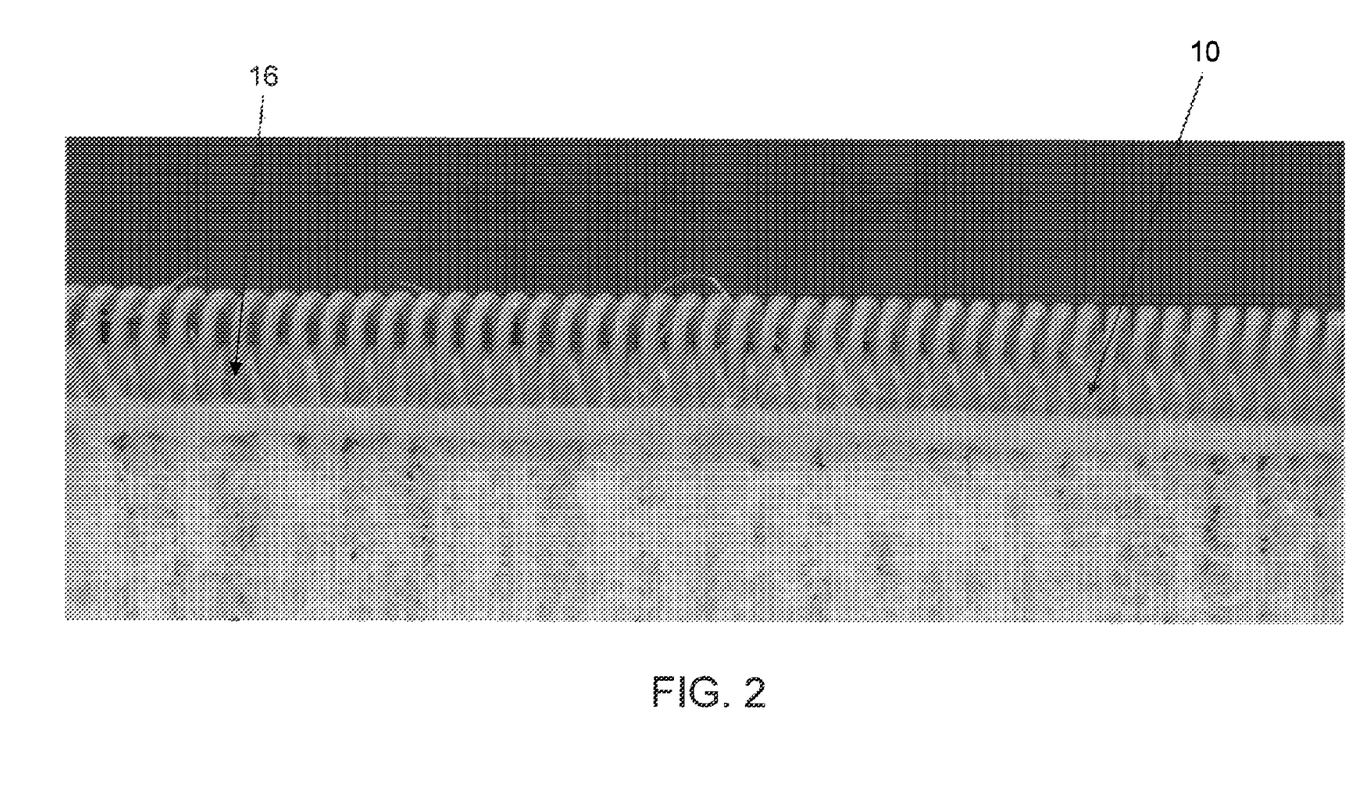
FIG. 2 is a photograph of a loop seam stabilized by a stabilizing element on an on machine seamable fabric.

Another problem arises as a result of a phenomenon called the secondary helix effect. Ideally, the pin seam loops will be properly oriented when their planes are perpendicular to the plane of the fabric and parallel to the machine direction. Such an orientation makes it possible for the loops at each end of the fabric to be interdigitated and alternated easily during the joining of the ends to form a pin seam. The secondary helix effect is observed in the tendency of a loop 10 formed from a ply/twisted yarn 12 having more than one strand to turn about an axis lying in the plane of the loop, such as that shown in FIG. 1. When this occurs, it represents a departure of the loop from the ideal orientation needed to form the pin seam. Such departure makes it difficult, if not impossible, to properly interdigitate and alternate the loops on each end of the fabric during closure, as well as to force the pintle through the void created by the interdigitated loops. Typically, the orientation of the seam loops 10 is maintained until installation using a stabilizing element 16, for example, a spiral coil, such as that disclosed in commonly owned U.S. Pat. No. 7,393,434 to Kornett, and shown in FIG. 2. However, once the stabilizing element is removed for installation of the fabric, the seam loops loose their orientation due to the secondary helix effect. Therefore, any on machine seamable fabric formed of ply/twisted yarns with more than one strand will have issues with loop alignment and orientation/parallelism.

SUMMARY OF THE INVENTION

Accordingly, fusing or welding of the strands of synthetic polymeric yarns by focused laser energy, especially those in the "pin" seam area of fabrics, without causing appreciable loss of yarn properties; major alteration of size and/or shape of the yarns; having a seam that has properties like the body of the fabric; and if the seam area is shorter in the MD than normally used, strength sufficient to allow the fabric to run a useful life when installed and used on a paper or other industrial machine, is the subject of the present invention.

Surprisingly, the deficiencies of the art are overcome by the objects of the invention which are described below:

One object of the invention is to provide an improved seam for a papermaker's or other industrial fabric or belt.

Another object is to provide an improved seam for a papermaker's or other industrial fabric or belt that has properties such as strength, durability, openness, and other properties essentially the same as the fabric body.

Another object of the invention is to enable fabric designs that have not been commercialized due to the inability to make seams with adequate strength using conventional seaming technology.

Another object of the invention is to provide appropriate materials in desired locations which will act as laser energy absorbers.

Another object of the invention is to provide a process for applying and/or incorporating the appropriate laser energy absorbing materials in the desired locations.

Another object of the invention is to reduce or eliminate the issues of deformation, untwisting, orientation and secondary helix in the seam loops of on machine seamable fabrics formed of yarns having more than one strand.

BRIEF DESCRIPTION OF THE DRAWINGS

The present invention will now be described in more complete detail with references being made to the figures wherein like reference numerals denote like elements and parts, which are identified below.

DETAILED DESCRIPTION OF THE INVENTION

The present invention relates to improving seams in on machine seamable paper machine clothing and other industrial fabrics by utilizing laser energy. The present invention, specifically, relates to improving seams in fabrics or belts used in the forming, pressing, and drying sections of a paper machine, industrial process fabrics and belts, TAD fabrics, engineered fabrics and corrugator belts. Again, the fabrics and belts referred to herein may include those also used in the production of, among other things, wetlaid products such as paper and paper board, and sanitary tissue and towel products made by through-air drying processes; corrugator belts used to manufacture corrugated paper board and engineered fabrics used in the production of wetlaid and drylaid pulp; in processes related to papermaking such as those using sludge filters and chemiwashers; and in the production of nonwovens produced by hydroentangling (wet process), meltblowing, spunbonding, airlaid or needle punching. Such fabrics and belts include, but are not limited to: embossing, conveying, and support fabrics and belts used in processes for producing nonwovens; filtration fabrics and filtration cloths; and fabrics and belts used for textile finishing processes such as calendering and hide tanning.

The present invention also relates to fabrics produced using such an improved seam.

The present invention also relates to a process for producing such an improved seam.

Most or all types of seams, such as for example the commonly known pin seam or inline spiral seam, which also requires reweaving of MD yarns into the fabric body and has the potential therefore to fail due to yarn slippage and pull out, can be improved by the laser welding technique described herein. In such seams, the MD yarns which form the seam loops themselves can additionally be welded or fused to the CD yarns to prevent them from pulling out under operating tensions in use.

Figure 3:
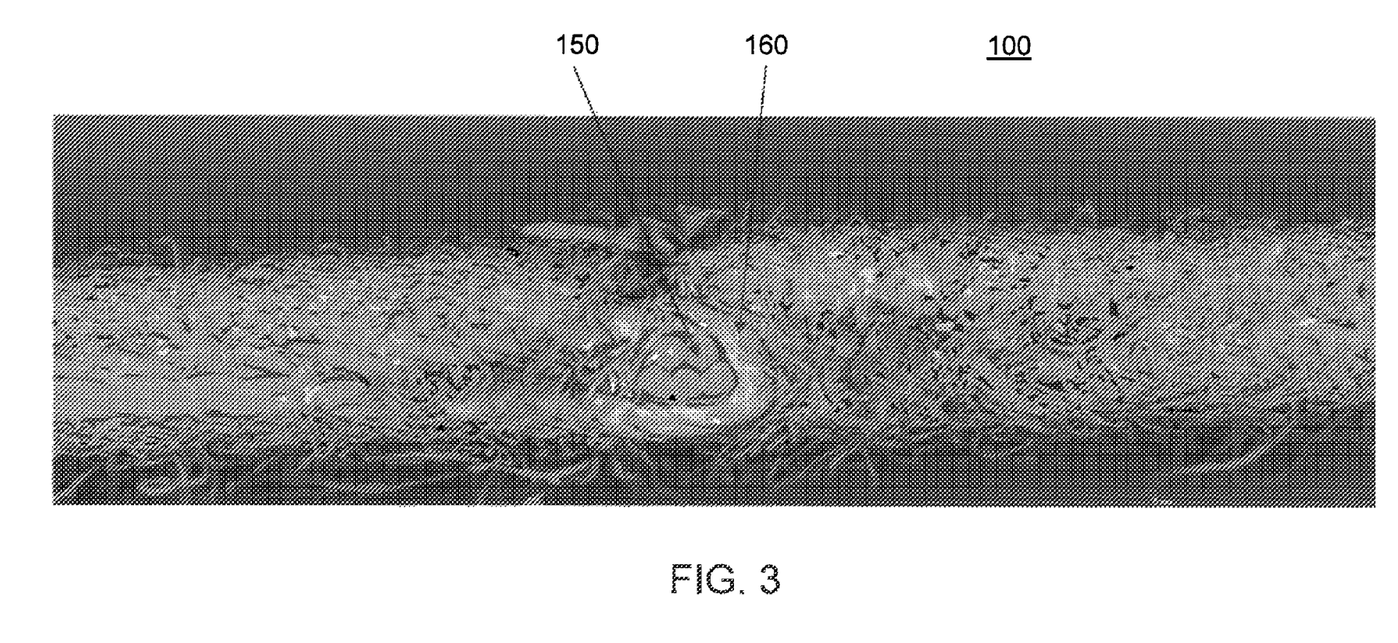
FIG. 3 is a photograph of an on machine seamable fabric, according to one embodiment of the invention.

The present invention is directed towards applying a laser absorbing material on seaming loops in an on machine seamable fabric. Note rather than applying the laser absorbing material, it could also be incorporated in one or more strands constituting the yarns during extrusion. The seaming loops 160 in an on machine seamable fabric 100 may be formed from plied or ply/twisted yarns having more than one strand. Fabric 100 may be a modified endless woven fabric, or the fabric may have a woven in loop seam or pin seam by flat weaving the fabric, raveling out some of the CD yarns, and weaving back in the MD yarns to form loops on each fabric edge. Fabric 100 can also be a seamed nonwoven fabric structure using an MD yarn array that forms the seaming loops 160, as shown in FIG. 3. Seaming loops 160 can be formed from an MD yarn array of plied or ply/twisted yarns having more than one strand, and may include one or more layers of CD yarns 150 that are not woven with the MD yarns, but placed above, below, or sandwiched between layers of the MD yarn array.

Figure 4:
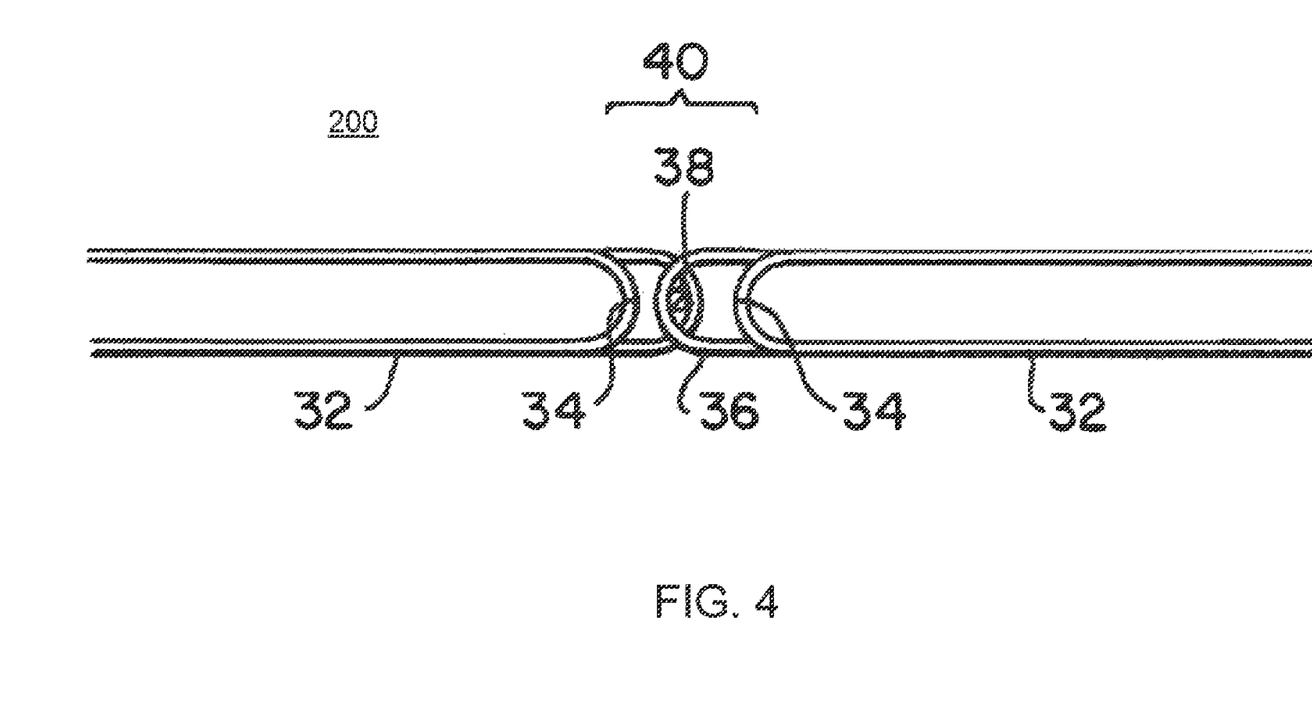
FIG. 4 is a schematic view of an on machine seamable fabric, according to one embodiment of the invention.

The MD yarn array may be formed according to the method disclosed in commonly owned U.S. Pat. No. 6,491,794 to Davenport and U.S. Patent Application Publication No. 2005/0102763 to Eagles, the entire contents of which are incorporated herein by reference. For example, fabric 200 can have a flattened array of a plurality of turns of a spirally wound, non-overlapping yarn 16 having a plurality of individual yarn strands, with two or more layers, such as that shown in FIG. 4, for example. The yarn 16 in each of the plurality of turns may have a substantially lengthwise orientation in each of the two layers and may form a plurality of seaming loops 34, 36 along each of the two widthwise edges. Pintle 38 may be directed through the passage formed by the interdigitated loops 36 to join ends 32 to one another at seam 40, as shown in FIG. 4.

Figure 5:
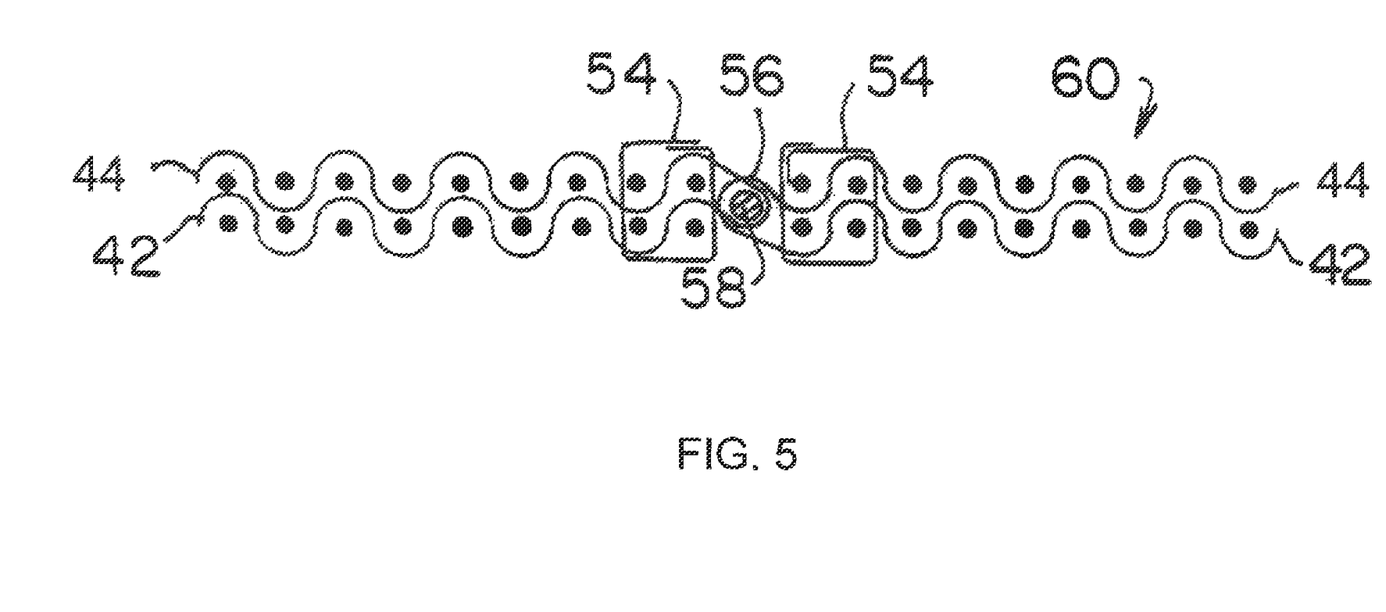
FIG. 5 is a schematic view of an on machine seamable fabric, according to one embodiment of the invention.

The fabric can also be produced according to the method disclosed in commonly owned U.S. Pat. No. 5,939,176 to Yook, the entire contents of which is incorporated herein by reference. For example, fabric 60 can be an on-machine-seamable multi-axial press fabric, such as that shown in FIG. 5, for example. Fabric 60 may have a first fabric ply 44 and a second fabric ply 42 fashioned from an endless base fabric layer. The endless base fabric layer may be formed from a fabric strip that can be spirally wound in a plurality of contiguous turns where the lateral edges of the turns abut each other, thereby forming a helically continuous seam separating adjacent turns of the fabric strip. The endless base fabric layer may be flattened to produce the first fabric ply 44 and the second fabric ply 42 and can be connected to one another at folds along the two widthwise edges. One or more crosswise yarn in each of the turns of the fabric strip can be removed at each of the folds at the two widthwise edges to provide unbound sections of lengthwise yarns of the fabric strip at the folds. The unbound sections serve as seaming loops 56 for joining the widthwise edges of the flattened base fabric layer to one another to form an endless loop. As shown in FIG. 5, a pintle 58 is directed through the passage defined by the interdigitated seaming loops 56 to join the two widthwise edges 36 of the flattened base fabric layer 22 to one another, thereby forming a two-ply base fabric 60 for an on-machine-seamable multi-axial press fabric. It is to be noted, however, that the double length fold over method disclosed in the '176 patent can be applied for both woven structures and structures formed of spiral wound strips of material, i.e. seamed multi-axial fabrics.

In all of these examples, the laser dye or laser absorbing material is applied on the seam loops 160 formed by the MD yarns having more than one strand themselves and also on the area in the main body of the fabric immediately adjacent to the seam loops. One advantage of using an aqueous dye is that the dye more easily migrates to the interstices between the strands making up the yarns; however, non-aqueous dyes may also be used. Just the seaming loops may be exposed to the laser energy by focusing the laser source at the seaming loops to cause partial melting and permanent welding or fusion of the strands constituting the yarn seam loops, which would make the yarns act more like a single monofilament. This mitigates, to a large degree, the issues of deformation, untwisting, orientation and secondary helix of seam loops in on machine seamable fabrics formed from these yarns. The laser dye or laser absorbing material may be applied as a coating on the seaming loops before the fabric is seamed so the seam loops are stabilized. The laser dye can be a solvent based or aqueous based dye. The laser dye can be, for example, a dye from American Dye Source, Inc. or a dilution of black ink or any other material suitable for the purpose.

In on machine seamable fabrics where the MD and CD yarns do not weave with each other, or where CD yarns are absent, the above method can serve a dual purpose. The MD yarns in such fabrics do not have sufficient crimp due to the 'nonwoven' nature of the fabric structure, and as such, in a seamed nonwoven structure the use of monofilaments to form the MD loops may result in yarn breaking, and causing a known phenomenon called "spaghetti." Yarns or yarn segments will migrate out of the fabric causing safety and/or operational problems. The instant method avoids breaking of the yarn by the use of yarns having more than one strand, the strand which typically can be as fine as 6.7 dtex (6 denier) and as large as 0.60 mm (0.024 in). These yarns provide the required flexibility and strength to the fabric and at the same time mitigate the issues of deformation, untwisting, orientation and secondary helix by fusing the strands that make up the yarns, making the yarns act more like single monofilaments.

It must be noted, however, that in all of the above structures, the body of the fabric may be masked so that only the seam area, or working area, may be exposed to the laser energy. This would particularly apply if the laser absorbing dye was incorporated in one or more strands during extrusion rather than just being located on the seaming loops.

One advantage of using the laser dye on the seam loops themselves is proper alignment of the loops due to stiffening of the plied or ply/twisted yarns that form the loops so they can hold up their shape and not untwist, and maintain their relative parallelism.

As stated above, another approach to making welds also utilizes a laser dye or laser pigment. In this case the laser dye or laser pigment is dispersed in the material comprising the yarn strand. Typically, the concentration of the laser dye or laser pigment is less than 0.4%. The presence of the laser dye or laser pigment allows one to make an "energy absorbing" yarn strand which will fuse the strands together at the frequency of the energy source applied at the seaming loop with the aforesaid advantages. Preferably, a laser energy source is used as lasers are designed to deliver precise amounts of energy to specific locations.

Many choices exist for laser energy absorbing materials. The earliest example was carbon black. The choice of material, the quantity of material, and the location of the material, all determine the resultant characteristic of the fused bond.

Thus the present invention, its objects, and advantages, are realized and although preferred embodiments have been disclosed and described in detail herein, its scope and objects should not be limited thereby; rather its scope should be determined by that of the appended claims.

The invention claimed is:

1. A method for welding or fusing seaming loops of an on machine seamable industrial fabric, the method comprising the steps of:
   forming seaming loops from yarns having more than one strand;
   providing a laser energy absorbing material in association with said seaming loops; and
   focusing a laser source at said seaming loops, thereby partially melting and permanently welding or fusing said strands constituting said yarns forming said seaming loops.

2. The method of claim 1, wherein said laser energy absorbing material is a coating applied on said seaming loops.

3. The method of claim 2, wherein said coating is applied by dye coating on said seaming loops before said fabric is seamed.

4. The method of claim 1, wherein said laser absorbing material is contained in one or more strands of said yarns.

5. The method of claim 1, wherein said laser energy absorbing material is an aqueous or non-aqueous based dye.

6. The method of claim 1, wherein said laser energy absorbing material is a dye or a dilution of black ink.

7. An improved seam in an industrial fabric comprising:
a plurality of seaming loops in a seam area of said fabric, wherein said seaming loops are formed from yarns having more than one strand, and wherein said seaming loops are welded or fused by providing a laser energy absorbing material in association with said seaming loops and focusing a laser source at said seaming loops, thereby partially melting and permanently welding or fusing strands constituting said yarns forming said seaming loops.

8. The seam of claim 7, wherein said laser energy absorbing material is a coating applied on said seaming loops.

9. The seam of claim 8, wherein said coating is applied by dye coating on said seaming loops before said fabric is seamed.

10. The seam of claim 7, wherein said laser energy absorbing material is an aqueous or non-aqueous based dye.

11. The seam of claim 7, wherein said laser absorbing material is contained in one or more strands of said yarns.

12. The seam of claim 7, wherein said laser energy absorbing material is a dye or a dilution of black ink.

* * * * *